US011732078B2

(12) United States Patent
Liu et al.

(10) Patent No.: US 11,732,078 B2
(45) Date of Patent: Aug. 22, 2023

(54) PREPARATION OF UREA-FORMALDEHYDE/POLY(BUTYLENE SUCCINATE) AND ITS TERNARY BIODEGRADABLE POLYMER NANO SLOW/CONTROLLED RELEASE MATERIALS BY REACTIVE EXTRUSION

(71) Applicant: North University of China, Shanxi (CN)

(72) Inventors: Yaqing Liu, Taiyuan (CN); Guizhe Zhao, Taiyuan (CN); Wei Zhang, Taiyuan (CN); Yang Xiang, Taiyuan (CN)

(73) Assignee: North University of China, Taiyuan (CN)

( * ) Notice: Subject to any disclaimer, the term of this patent is extended or adjusted under 35 U.S.C. 154(b) by 409 days.

(21) Appl. No.: 16/936,242

(22) Filed: Jul. 22, 2020

(65) Prior Publication Data

US 2021/0261709 A1  Aug. 26, 2021

(30) Foreign Application Priority Data

Feb. 25, 2020 (CN) .......................... 202010114682.4
Feb. 25, 2020 (CN) .......................... 202010114691.3

(51) Int. Cl.
 *C08F 283/02* (2006.01)
 *C08G 71/02* (2006.01)

(52) U.S. Cl.
 CPC ............ *C08F 283/02* (2013.01); *C08G 71/02* (2013.01)

(58) Field of Classification Search
 None
 See application file for complete search history.

(56) References Cited

U.S. PATENT DOCUMENTS

| 2020/0040495 | A1* | 2/2020 | Yamada | ............. | B65D 85/8061 |
| 2020/0172447 | A1* | 6/2020 | Gurumallappa | ......... | C05G 5/40 |
| 2021/0380502 | A1* | 12/2021 | Hu | ............................ | C05B 7/00 |

OTHER PUBLICATIONS

English abstractor CN 109809849 A (May 28, 2019), China.*

* cited by examiner

*Primary Examiner* — Tae H Yoon

(57) ABSTRACT

The invention relates to the field of preparing biodegradable polymer slow/controlled release composite, in particular to a biodegradable polymer slow/controlled release binary composite urea-formaldehyde/poly(butylene succinate) and a biodegradable polymer slow/controlled release ternary nanocomposite urea-formaldehyde/poly(butylene succinate)/potassium dihydrogen phosphate. The following steps are included: uniformly mixing two components poly(butylene succinate) and methylol-urea or three components poly(butylene succinate), methylol-urea and potassium dihydrogen phosphate, and then extruding the resulting mixture by an extruder, and the biodegradable polymer slow/controlled release composite urea-formaldehyde/poly(butylene succinate) containing nutrient N and the biodegradable polymer slow/controlled release nanocomposite urea-formaldehyde/poly(butylene succinate)/potassium dihydrogen phosphate containing nutrients of N, P and K are obtained respectively. As one of the raw materials, methylol-urea, the precursor of urea-formaldehyde, can react by way of melt polycondensation to form urea-formaldehyde macromolecular chains with different polymerization degrees at high temperature in the extruder, which are dispersed among the PBS macromolecular chains, thereby obtaining the composite UF/PBS of the present invention; and the hindering effect of the molecular segments of urea-formaldehyde and poly(butylene succinate) and the hydrogen bond interaction between the components result in that potassium dihydrogen phosphate crystals dissolved in the water produced by the polycondensation reaction are restricted to nanoscale during their precipitation process, so as to prepare nanocomposite UF/PBS/MKP. The prepared composites all have excellent mechanical properties, and can be directly used as a biodegradable polymer slow/controlled release fertilizer, or as a matrix polymer to prepare other types of slow release (Continued)

fertilizers, and the formulae with high PBS contents can also replace PBS to prepare other agricultural implements, such as agricultural films, nursery pots and vegetation nets.

8 Claims, 16 Drawing Sheets

PREPARATION OF UREA-FORMALDEHYDE/POLY(BUTYLENE SUCCINATE) AND ITS TERNARY BIODEGRADABLE POLYMER NANO SLOW/CONTROLLED RELEASE MATERIALS BY REACTIVE EXTRUSION

CROSS-REFERENCE TO RELATED APPLICATIONS

This application claims the benefit of priority from Chinese Patent Application No. 202010114691.3, filed on Feb. 25, 2020 and Chinese Patent Application No. 202010114682.4, filed on Feb. 25, 2020. The content of the aforementioned applications, including any intervening amendments thereto, is incorporated herein by reference in its entirety.

TECHNICAL FIELD

The present invention relates to the field of biodegradable polymer slow/controlled release composites, in particular to urea-formaldehyde/poly(butylene succinate), a biodegradable polymer slow/controlled release composite containing nutrient N, and urea-formaldehyde/poly(butylene succinate)/potassium dihydrogen phosphate, a biodegradable polymer slow release nanocomposite containing nutrients N, P and K prepared by a reactive extrusion approach.

BACKGROUND ART

The basic polymer used as slow/controlled release nitrogen-containing fertilizer is urea-formaldehyde (UF) at present. UF is a long-chain polymer that can be degraded by microorganisms, thereby resulting in the slow release of nutrient N contained. However, large-scale preparation of UF granules is usually complex, since it involves reactions in a liquid medium, and formaldehyde solution, as one of the main raw materials, contains about 70% by weight of water, which prevents the preparation of UF granules by simple, fast and conventional processes, such as extrusion. In addition, the high crystallinity of UF polymer leads to its extremely low nitrogen release rate in practical use. At the same time, unfortunately, UF is thermosetting, so it can only be mixed with other materials by the blending process, which makes it difficult to obtain the UF-based composites with the each component well-dispersed. Preparation of biodegradable polymer and nitrogen-containing composite fertilizers by industrial blending methods extrusion process and their slow/controlled release properties have been studied currently. However, all of them only involve urea/biodegradable polymer composite systems; the preparation of UF/biodegradable polymer composites by an extrusion process has not been reported so far.

Among biodegradable polymers, poly(butylene succinate) (PBS) is one of the most promising one in academic, industrial and agricultural fields due to its excellent properties, such as processability at low temperature (~120° C.), thermal stability and chemical resistance. In addition, its melting point is ~115° C., very close to the melting point of methylol-urea (MU), about 105° C. Especially, UF could be obtained by melt polycondensation of MU in the extruder through temperature control during the reactive extrusion process. Therefore, it should be possible to prepare composite urea-formaldehyde/poly(butylene succinate) (expressed as UF/PBS) with excellent slow/controlled release performance by extruding PBS and MU together and by controlling the extrusion process conditions at the same time, which should also be a new and simple method for preparing urea-formaldehyde-based slow/controlled release fertilizers or PBS-based biodegradable composites.

In addition to nitrogen (N), the major nutrients required for growth of plants also comprise phosphorus (P) and potassium (K). Potassium dihydrogen phosphate (MKP) is a phosphorus and potassium fertilizer widely used in agriculture at present. It provides many good effects to crops, such as a significant increase in yield and income, an improved and optimized quality, resistance to lodging, resistance to diseases and insect pests and preventing premature aging, and it has the function of overcoming the nutritional deficiencies caused by the aging and decline of absorptive capacity of the root system at the later stage of crop growth. However, MKP has a higher solubility and has no slow/controlled release properties, so it is easily lost. Furthermore, excessive leaching of P will lead to the risk of eutrophication in rivers, lakes and seas. Nano-fertilizers possess some excellent properties due to their nano-scale thereof, and have attracted widespread interests in recent years, but there exist some problems, such as complex preparation process, difficulty in industrial production and so on.

DESCRIPTION OF THE INVENTION

In view of the above problems, in the present invention, UF/PBS, a binary biodegradable polymer slow/controlled release composite containing nutrient N, and urea-formaldehyde/poly(butylene succinate)/potassium dihydrogen phosphate (expressed as UF/PBS/MKP), a ternary biodegradable polymer slow/controlled release nanocomposite containing nutrients N, P and K, are prepared by a reactive extrusion process. They can not only release nutrient N or nutrients N, P and K slowly during their degradation process, but also possess excellent mechanical properties. In particular, their preparation process is simple, easy to large-scale industrial production, and low cost. The present invention is achieved by the following technical solutions: a method for preparing a biodegradable polymer slow/controlled release composite urea-formaldehyde/poly(butylene succinate) and a biodegradable polymer slow/controlled release nanocomposite urea-formaldehyde/poly(butylene succinate)/potassium dihydrogen phosphate by reactive extrusion, comprising the steps of: mixing two components PBS and MU or three components PBS, MU and MKP uniformly to obtain a binary mixture or a ternary mixture, and then extruding the produced binary or ternary mixture by a twin-screw extruder, and UF/PBS, a biodegradable polymer slow/controlled release composite containing nutrient N, or UF/PBS/MKP, a biodegradable polymer slow/controlled release nanocomposite containing nutrients N, P and K, is obtained.

In the present invention, PBS and methylol-urea (MU), the precursor of UF, are used as the raw materials, and the added methylol-urea could produce UF molecular chains with different polymerization degrees by melt polycondensation reaction at the high temperature of the extruder during the reactive extrusion process, thus obtaining the N-containing binary biodegradable polymer slow/controlled release composite UF/PBS of the present invention. The by-product water is generated during the reaction of MU to produce UF. Therefore, the easily soluble raw material MKP will dissolve in the water generated by the melt polycondensation of MU in its surrounding environment. After water evaporates under the higher temperatures in the extruder, MKP crystals will precipitate and grow into nano-scale crystal particles due to the hindering of their surrounding UF and PBS macromolecular chain segments (namely the "cage effect" of UF and PBS macromolecular chain) and the hydrogen bond interaction between potassium dihydrogen phosphate and UF molecular chains, thereby obtaining the ternary biodegradable polymer slow/controlled release nanocomposite UF/PBS/MKP containing nutrients N, P and K.

As a further improvement of the technical solution of the present invention, the extrusion temperatures of the twin-screw extruder are between 100° C. and 120° C. When it is implemented specifically, the temperatures from the feeding zone to the die head of the twin-screw extruder are 100-110-120-120-115° C. successively.

As a further improvement of the technical solution of the present invention, the methylol-urea powder is prepared by the following method: adding urea and formaldehyde to a reactor, adjusting the resulting solution to pH=9, reacting them at 50° C., freezing and vacuum filtering the reaction solution to obtain a filter cake, drying the filter cake, and then crushing it to obtain the methylol-urea powder.

As a further improvement of the technical solution of the present invention, in the reactor, the molar ratio of formaldehyde to urea is 1:1.11.4, and preferably 1:1.2.

As a further improvement of the technical solution of the present invention, the raw material poly(butylene succinate) needs to be dried before being mixed with methylol-urea with or without potassium dihydrogen phosphate.

Those skilled in the art can also prepare methylol-urea powders with different contents of N by controlling the addition amounts of reaction raw materials urea and formaldehyde according to different requirements, and use them as raw materials to prepare biodegradable slow/controlled release polymer composite UF/PBS with different contents of nutrient N. In addition, biodegradable slow/controlled release polymer composite UF/PBS/MKP with different contents of nutrients P and K can also be prepared by adding different mass ratios of methylol-urea, PBS and MKP.

The present invention has the following advantages:

(1) Binary biodegradable polymer slow/controlled release composite UF/PBS containing nutrient N and ternary biodegradable polymer slow/controlled release nanocomposite UF/PBS/MKP containing nutrients N, P and K can be prepared in an ordinary screw extruder through a common extrusion process. The preparation process is simple and effective, which can save a lot of manpower, material resources and financial resources, especially easy to realize industrial production.

(2) By using methylol-urea, the precursor of urea-formaldehyde, as the raw material, and the added methylol-urea could generate UF molecular chains with different polymerization degrees by melt polycondensation reaction at the high temperature of the extruder during the reactive extrusion process, thereby preparing a composite. Compared to the blending material PBS+UF, which is prepared by directly blending UF and PBS, the prepared composite UF/PBS has better dispersion of both UF and PBS components in the composite and better compatibility there between, and thus has more excellent performance.

(3) During the reactive extrusion process, by means of the interaction between the components and the by-product water of the related reaction, the added ordinary potassium dihydrogen phosphate particles are turned into nano-scale potassium dihydrogen phosphate crystals, which not only is capable of endowing the instant potassium dihydrogen phosphate with a certain slow release performance, but also can serve as a modifier to improve the physical and mechanical properties of the prepared composite, and the method is simple and the effect is remarkable.

(4) The biodegradable polymer slow/controlled release composites UF/PBS and UF/PBS/MKP prepared by the present invention contain nutrient N or nutrients N, P and K can slowly release nutrients during their degradation process and provide nutrients for plants.

(5) The compressive strengths of composites UF/PBS and UF/PBS/MKP prepared by the present invention are much higher than that of pure UF. Therefore, when practically used as granular slow/controlled release fertilizers, the prepared composites UF/PBS and UF/PBS/MKP are more convenient to operate than pure UF and can reduce the breakage loss during transportation.

(6) The prepared biodegradable polymer slow/controlled release composites UF/PBS and UF/PBS/MKP can be directly used as a biodegradable polymer slow release nitrogen and phosphorus fertilizers, or as matrix polymers to prepare other types of slow release fertilizers, and the formulae with high PBS contents can also replace PBS to prepare other agricultural implements, such as agricultural films, nursery pots, vegetation nets, etc., due to their better mechanical property than pure PBS.

BRIEF DESCRIPTION OF THE DRAWINGS

In order to explain the embodiments of the present invention or the technical solutions in the prior art more clearly, drawings required for the description of the embodiments of the present invention or prior art will be briefly described below. Obviously, the drawings in the following description are only some embodiments of the present invention. For those of ordinary skill in the art, other drawings can be obtained in accordance with these drawings without any creative work.

In FIG. 1, MU, MU-Ex (i.e., UF obtained by reactive extrusion) and directly synthesized UF all have a characteristic absorption peak at 3327 cm$^{-1}$, which is the N—H stretching vibration absorption peak of secondary amide; and only the infrared spectrum of MU has the obvious characteristic absorption peaks at 3423 cm$^{-1}$ and 3231 cm$^{-1}$, which are the N—H stretching vibration absorption peak of primary amide. On the one hand, compared with that of the pure MU, in the infrared spectrum of MU-Ex (i.e., UF obtained by reactive extrusion), the N—H stretching vibration peaks of primary amide disappear and the N—H stretching vibration peak of secondary amide increases; and on the other hand, the infrared spectrums of MU-Ex (i.e., UF obtained by reactive extrusion) and directly synthesized UF are very similar. Therefore, it can be inferred that MU reacts by way of polycondensation to produce UF during the extrusion process.

In FIG. 2A, the characteristic absorption peaks in the infrared spectrums of PBS, MU-Ex (i.e., UF obtained by reactive extrusion), UF/PBS, and UF/PBS/MKP at 1712 cm$^{-1}$ are attributed to the C=O stretching vibration of the ester group in PBS, and the overlapping of this absorption peak in the spectra of all UF/PBS and UF/PBS/MKP with that of pure PBS indicates that there are no interactions between PBS and other components in any of the composites UF/PBS and UF/PBS/MKP. Peak at 3327 cm$^{-1}$ is the N—H stretching vibration peak of secondary amide and peak at 1622 cm$^{-1}$ is the asymmetric absorption vibration peak of —C=O of primary amide. The infrared characteristic peaks at these two regions of all the prepared UF/PBS and UF/PBS/MKP composites are consistent with those of MU-Ex (i.e., UF obtained by reactive extrusion), indicating that MU does undergo polycondensation reaction to generate UF in all the prepared composites. However, as can be seen from FIG. 2B, compared with that of MU-Ex (i.e., UF obtained by reactive extrusion), the absorption peaks at 1622 cm$^{-1}$ in the spectrums of UF/PBS all shift to the higher. Urea-formaldehyde polymer is easy to form intermolecular and intramolecular hydrogen bonds. However, the regularity and orderliness of UF macromolecule chains are destroyed by PBS molecular segments dispersed in UF macromolecular segments generated by reactive extrusion, which makes it difficult to form hydrogen bonds in UF macromolecular chains in composite UF/PBS generated by reactive extrusion, thereby resulting in the blue shift of —C=O stretching vibration peak in group —CONH$_2$ of UF in the spectrums of prepared composite UF/PBS. In addition, compared with that of MU-Ex (i.e., UF obtained by reactive extrusion), the blue shift of this peak in the infrared spectrum of UF30/PBS70 is more obvious than that of UF70/PBS30, indicating that with the increase of PBS content, its influencing degree on hydrogen bond of UF molecules increases, which further proves the correctness of the relevant analyses. Compared with that of UF30/PBS70, the blue shift of the peak at 1622 cm$^{-1}$ in the infrared spectrum of UF30+PBS70 obtained by directly extruding PBS and UF is far less than that of MU-Ex (i.e., UF obtained by reactive extrusion), indicating that component PBS in UF30+PBS70_does not affect the formation of intermolecular and intramolecular hydrogen bonds of component UF substantially, that is to say, there are still a large number of UF intermolecular and intramolecular hydrogen bonds formed in the system, indicating that components UF and PBS in the system are not dispersed uniformly. It can be seen from FIG. 2B that the absorption peaks at 1622 cm$^{-1}$ in the infrared spectra of UF/PBS/MKP system have more obvious blue shifted, indicating that the addition of MKP can also reduce the chance of formation of hydrogen bonds in UF segments, indicating that UF and PBS produced by reactive extrusion in the composite prepared by reactive extrusion are mixed in the segment scale.

Figure 1:
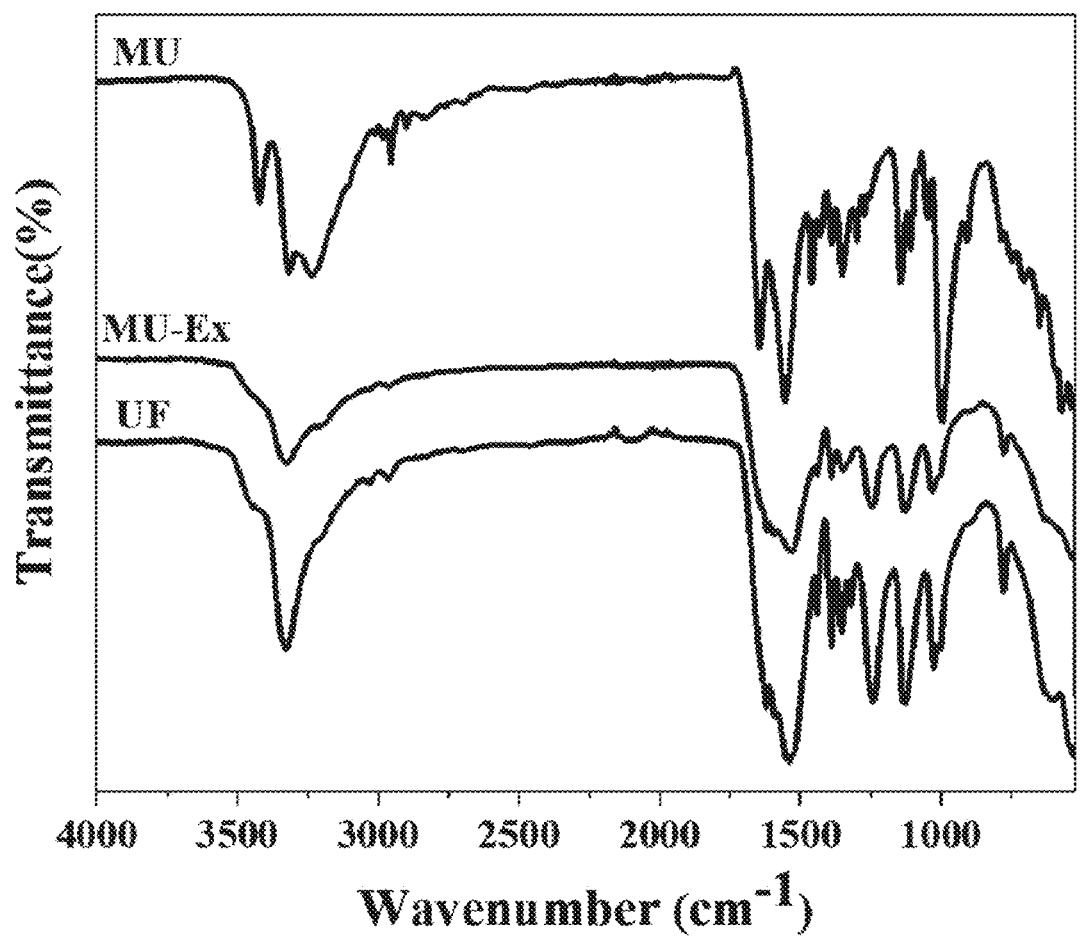
FIG. 1 shows the FTIR spectra of directly synthesized MU and UF produced by reactive extrution of MU (expressed as MU-Ex) and directly synthesized UF.
Figure 2A:
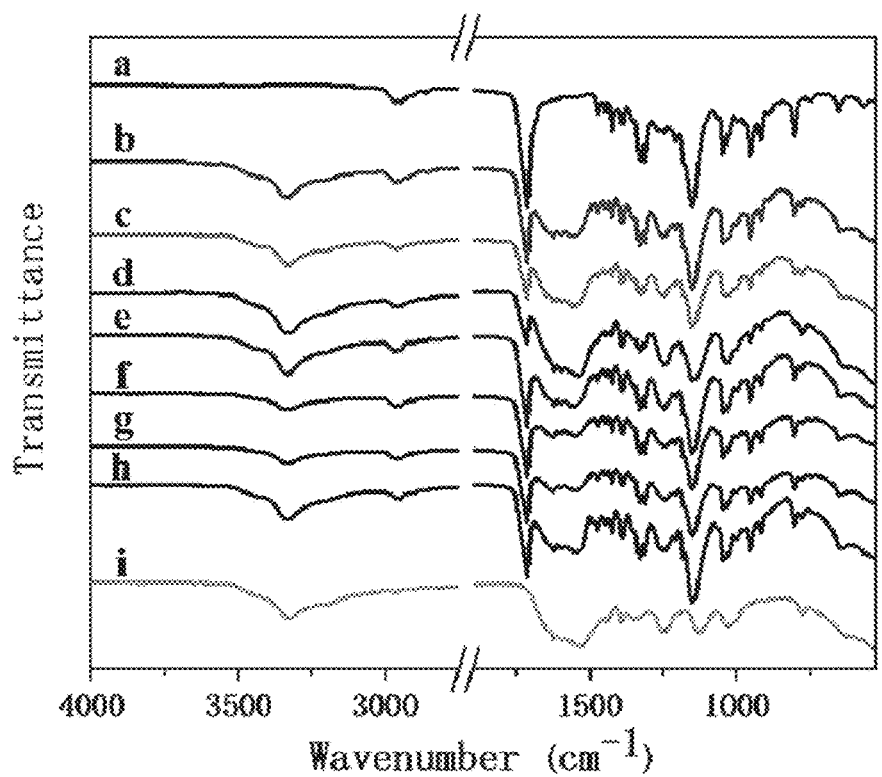
FIGS. 2A and 2B show the FTIR spectra of pure PBS (a), UF30/PBS70 (b), UF50/PBS50 (c), UF70/PBS30 (d), UF30/PBS69/MKP1 (e), UF30/PBS54/MKP6 (f), UF30/PBS58/MKP12 (g), UF30+PBS70 (h), and MU-Ex (i) in the regions of 525-4000 $cm^{-1}$ (2A) and 1600-1645 $cm^{-1}$ (2B).
Figure 2B:
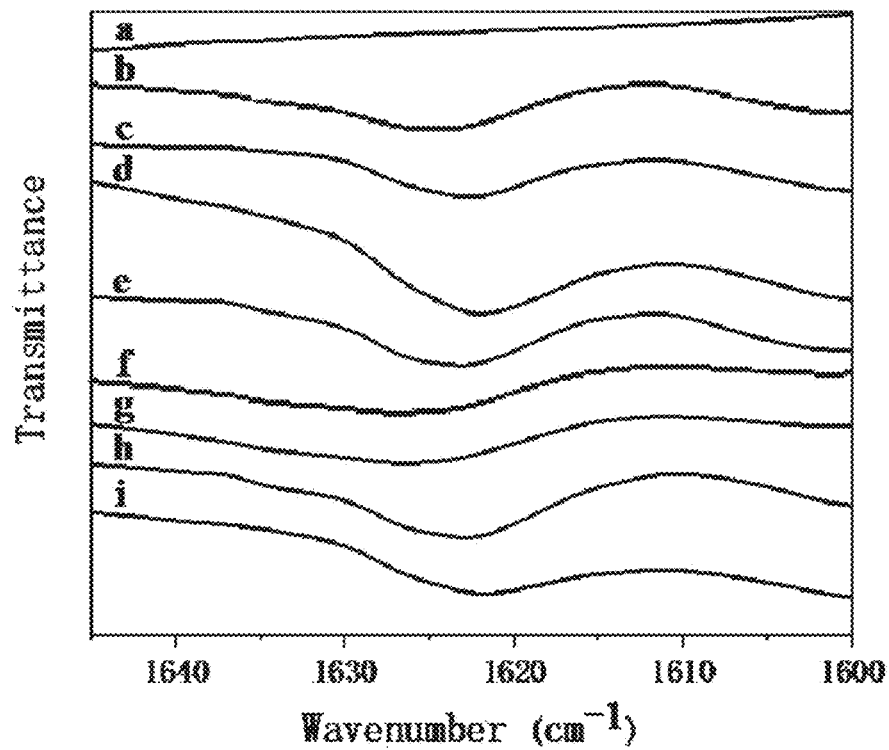
Figure 3A:
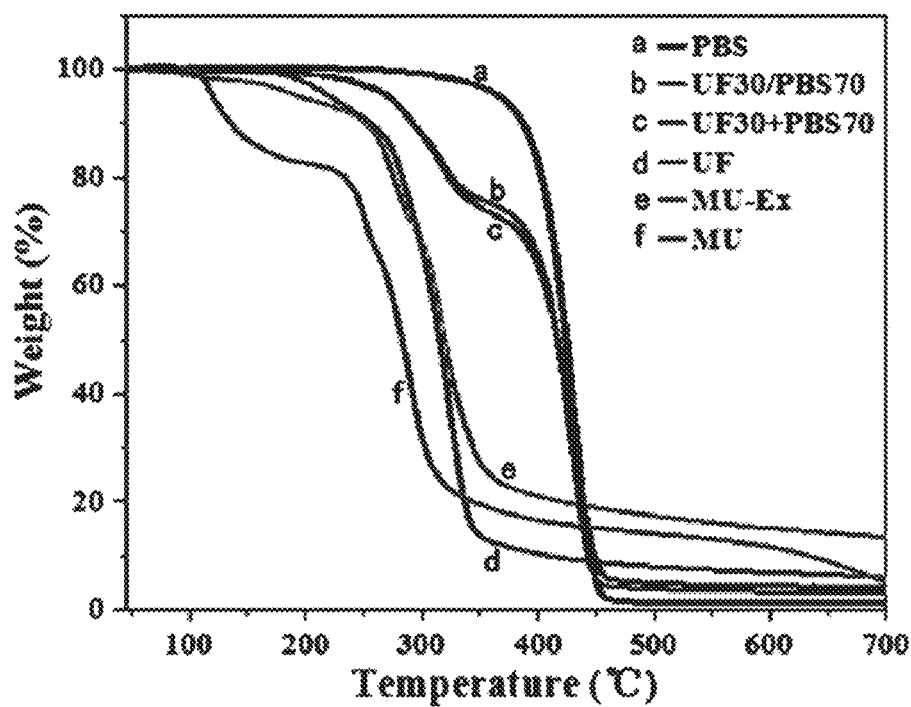
FIGS. 3A and 3B show the TG curves (3A) and DTG curves (3B) of the materials.
Figure 3B:
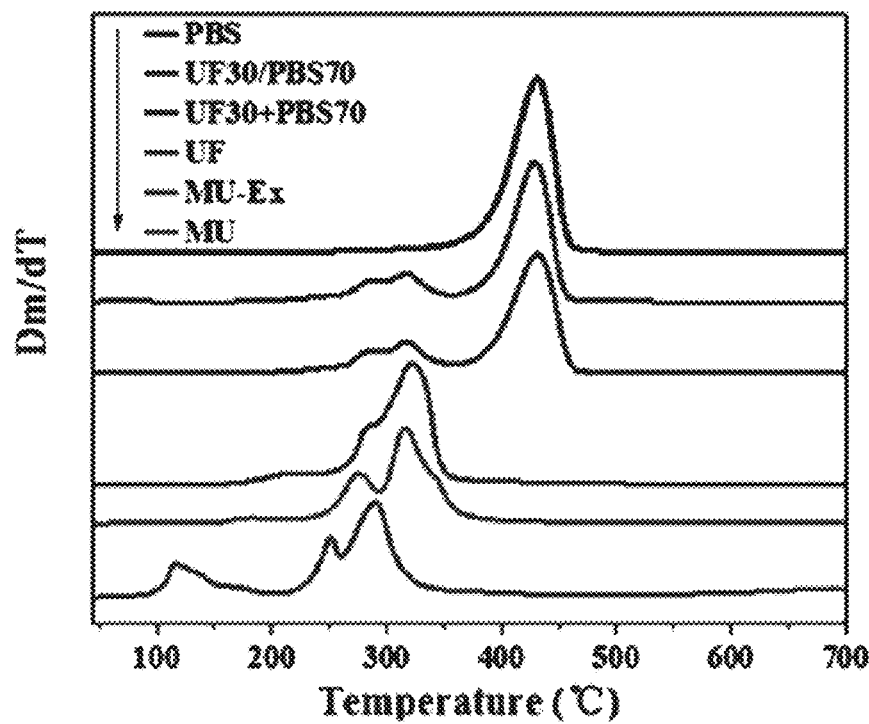

As can be seen from FIG. 3A, the TG curve of MU-Ex (i.e., UF obtained by reactive extrusion) is obviously different from that of MU. The main difference is that there is a thermal decomposition stage at 90-230° C. in TG curve of MU, which is the thermal decomposition stage of the unreacted urea during the synthesis process of MU. However, the TG and DTG curves of UF prepared by reactive extrusion, namely MU-Ex, are similar to those of the directly synthesized UF, which further proves that MU does undergo a polycondensation reaction to produce UF during the extrusion process. The slight difference between the TG curves of UF obtained by reactive extrusion (i.e., MU-Ex) and the synthesized UF is that the synthesized UF has higher $T_{5\%}$ and $T_{max}$, as shown in Table 2. In addition, it can also be seen from the TG curve that the UF produced by reactive extrusion of MU (i.e., MU-Ex) has two thermal decomposition stages: 150-210° C. and 210-600° C., which are similar to those of the directly synthesized UF, and the only difference between these two is that the latter has a higher initial thermal decomposition temperature of 230° C. in the second step. The reason for all these differences is that UF prepared by reactive extrusion (i.e., MU-Ex) has a lower degree of polymerization and a smaller relative molecular mass than those of the directly synthesized UF, and thus is more easily decomposed at a lower temperature. In addition, it also can be seen from FIGS. 3A and 3B that the main difference of the thermal performance test results between UF30/PBS70 and UF30+PBS70 is that the thermal stability parameters of UF30/PBS70 are slightly lower than those of UF30+PBS70. This is because, compared with the simple physically mixed system, the molecular segments of UF and PBS in UF30/PBS70 obtained by reactive extrusion are easier to disperse each other, and even reach a molecular segment mixing, leading to the formation of less hydrogen bond between UF molecule chains, and thus slightly deteriorating the thermal stability of UF30/PBS70.

Figure 4:
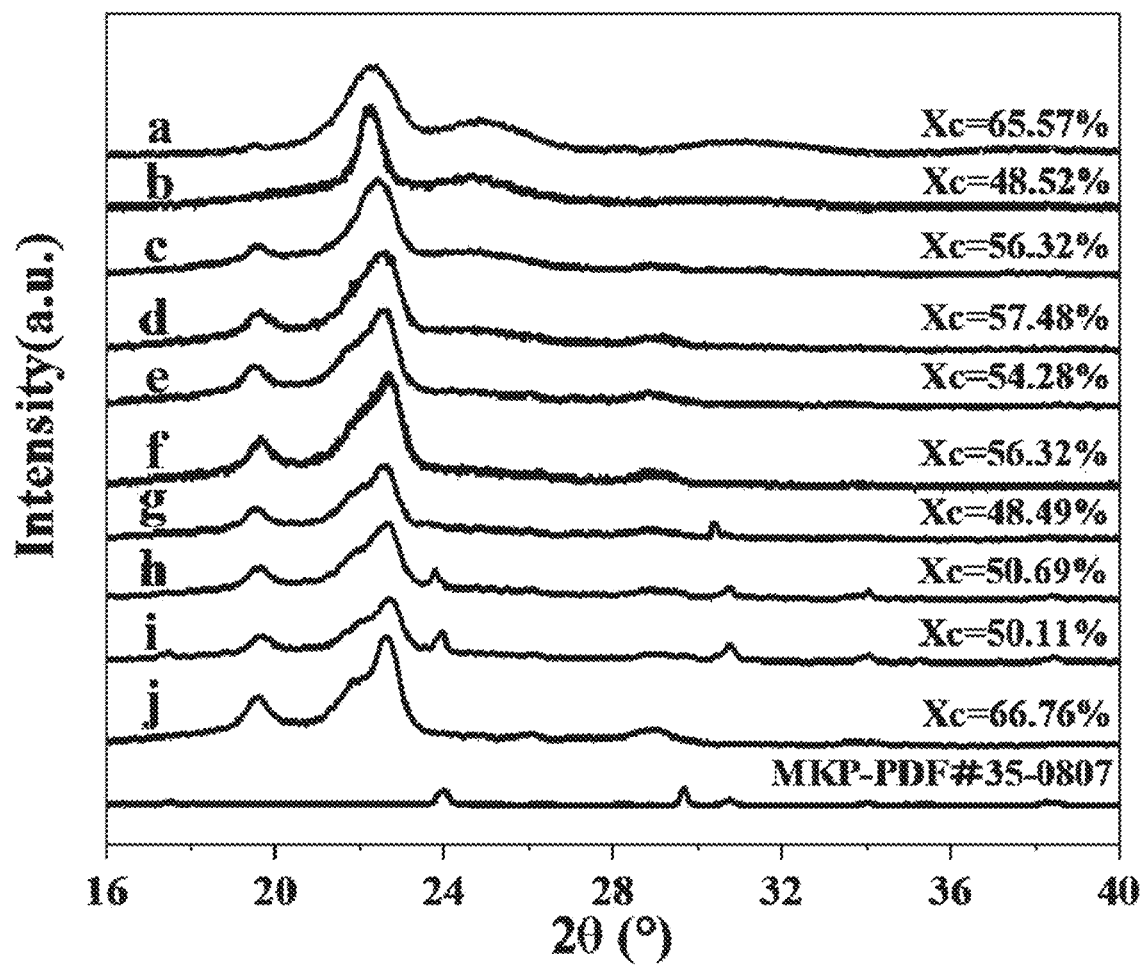
FIG. 4 shows the XRD spectra of synthesized pure UF (a), MU-Ex (b), UF70/PBS30 (c), UF50/PBS50 (d), UF30/PBS70 (e), UF30+PBS70 (f), UF30/PBS69/MKP1 (g), UF30/PBS64/MKP6 (h), UF30/PBS58/MKP12 (i), pure PBS (j) and MKP, and the total crystallinities of these materials calculated using Jade 6 software.

As can be seen from FIG. 4, the XRD diffraction peaks at 19.5°, 21.5° and 22.5° are observed in the XRD spectrum of pure PBS. The XRD spectrum of the synthesized UF show the characteristic peaks of 2θ=22.2°, 24.7° and 31.3°, which confirm the existence of explicit crystal regions in UF, and its total crystallinity is calculated to be 65.57%. The XRD spectrum of MU-Ex, that is UF prepared by reactive extrusion of the present invention, shows diffraction peaks similar to those of the synthesized UF, but have only two characteristic peaks of 2θ=22.2° and 24.7°, and its crystallinity is lower, i.e., only 48.52%, which is nearly 26% lower than that of the synthesized UF. These also prove the above results of TG and DTG analyses, that is, compared with synthesized UF, UF prepared by reactive extrusion of the present invention has a lower purity, a lower degree of polymerization and less perfect crystallization. For XRD spectra of UF/PBS, all the above diffraction peaks appear, and compared with that of MU-Ex (i.e., UF obtained by reactive extrusion of the present invention), the intensity of the main diffraction peak 2θ=22.2° of UF in the spectra of binary composite UF/PBS decreases with the increase of the contents of PBS, which is because some hydrogen bond of UF macromolecules is destroyed after introducing component PBS by reactive extrusion of the present invention, as known from the foregoing analyses, thus the UF crystal quantity formed due to the regular arrangement of its molecule chains under the action of hydrogen bonding is reduced. In addition, the peak shapes and main peak positions of PBS-related diffraction peaks in XRD spectra of binary composite UF/PBS are the same as those of pure PBS, indicating that the crystal forms of component PBS in these composites are unchanged, and the UF molecular segments are mainly mixed with the molecular segments in the amorphous region of PBS at a molecular segment scale, which reduces the total crystallinity of these binary composites compared with that of neat PBS. In addition, compared with UF/PBS introduced UF by reactive extrusion, the respective diffraction peaks of the two components in UF30+PBS70 are the same as those of their pure substances, and there are no any changes in position and intensity of these peaks, indicating that a large number of UF or PBS molecular segments still gather together in UF30+PBS70 obtained by simple mixing of components, and their crystals are formed under the influence of hydrogen bonding in these segments, making its total crystallinity thereof higher than that of UF30/PBS70. In XRD spectra of UF30/PBS/MKP, all the above diffraction peaks appear. But the intensity of diffraction peak of UF, at $2\theta=22.2°$, in XRD spectra of MU-Ex and nanocomposite UF30/PBS/MKP prepared by reactive extrusion of the present invention are all weaken with the increasing of MKP content, and the total crystallinity of the resulting nanocomposite UF30/PBS/MKP decreases, indicating that the addition of MKP will reduce the amount of UF crystals produced by reactive extrusion of the present invention.

Figure 5A:
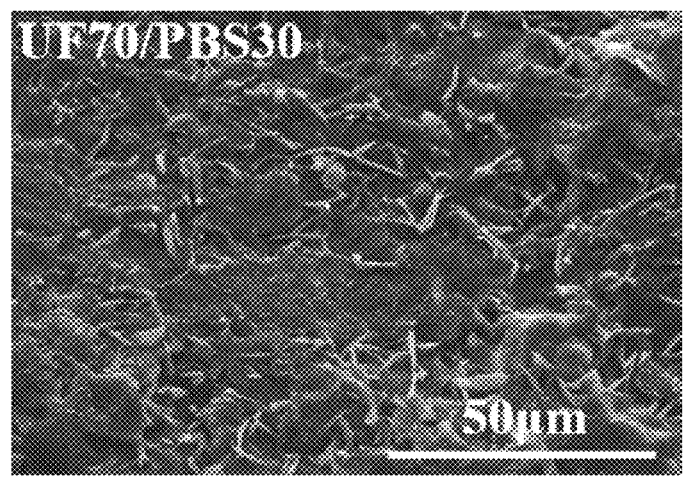
FIGS. 5A-5P show separately the SEM-EDX photos of the brittle fracture surfaces in liquid nitrogen of PBS, UF/PBS, UF30+PBS70 and UF30/PBS58/MKP12, and the TEM photos of UF30/PBS69/MKP1 and UF30/PBS58/MKP12.
Figure 5B:
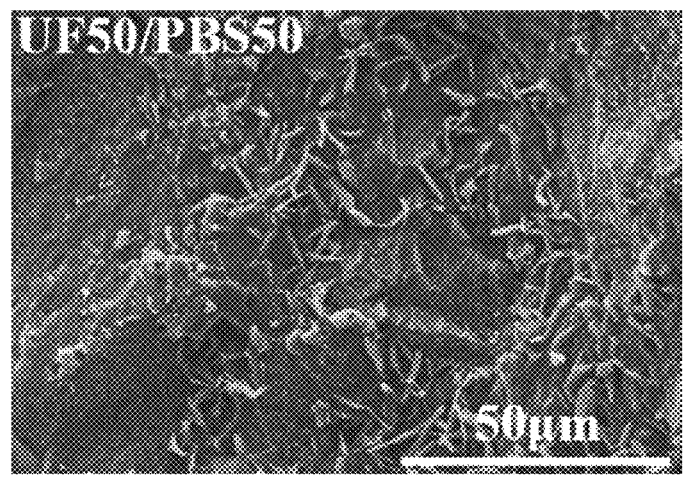
Figure 5C:
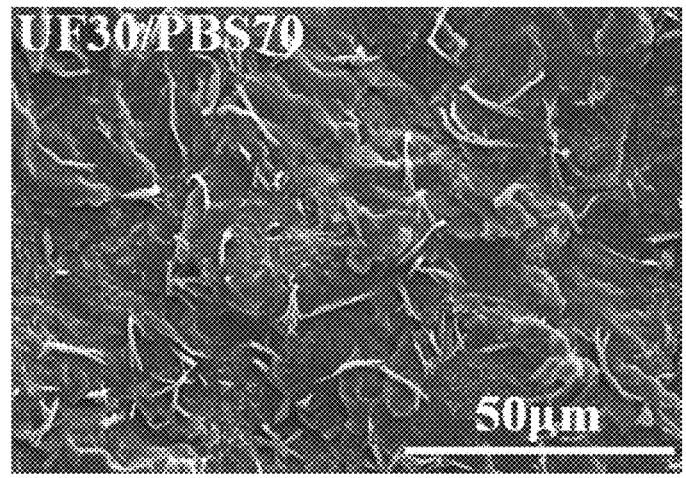
Figure 5D:
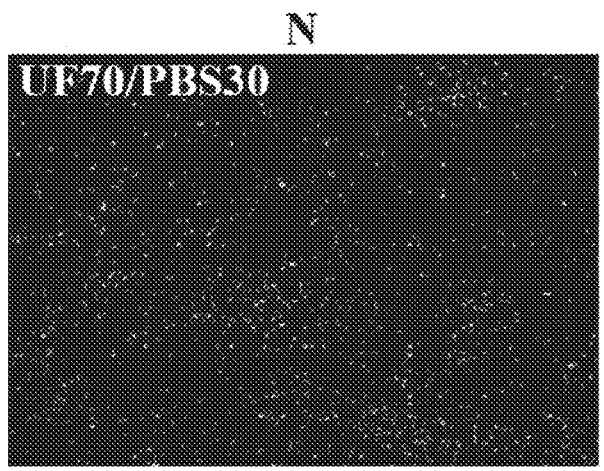
Figure 5E:
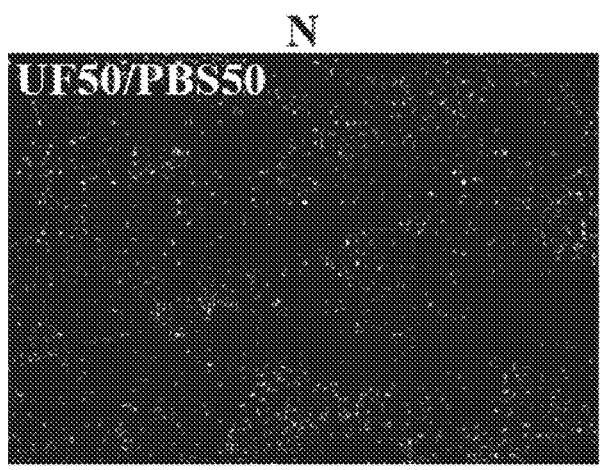
Figure 5F:
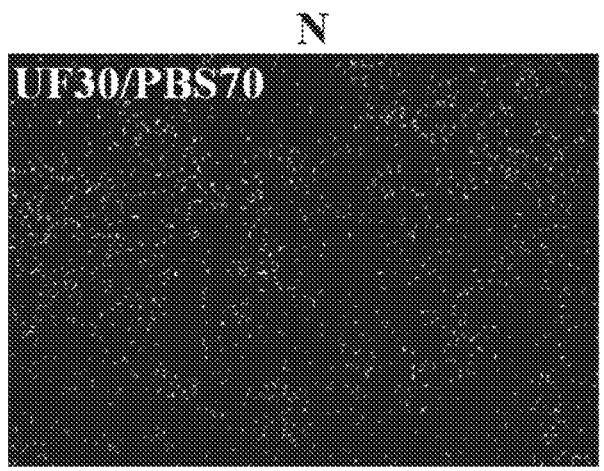
Figure 5G:
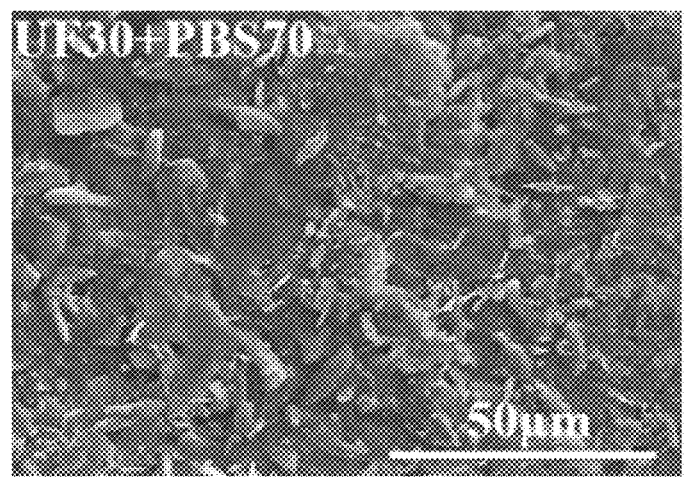
Figure 5H:
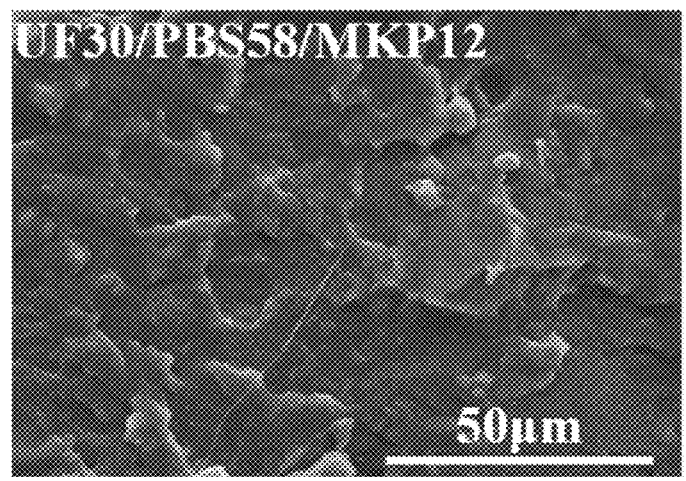
Figure 5I:
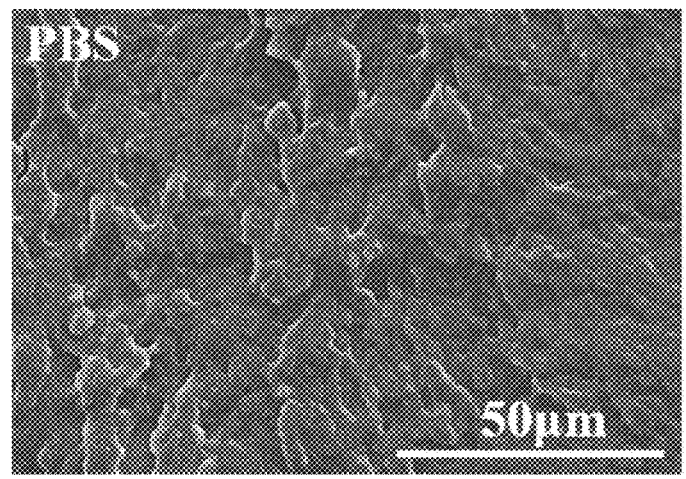
Figure 5J:
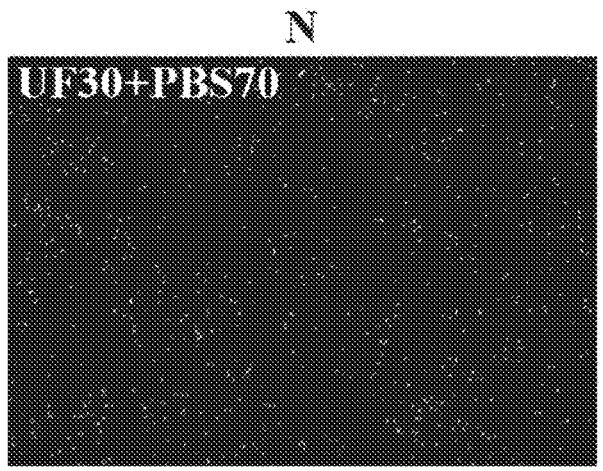
Figure 5K:
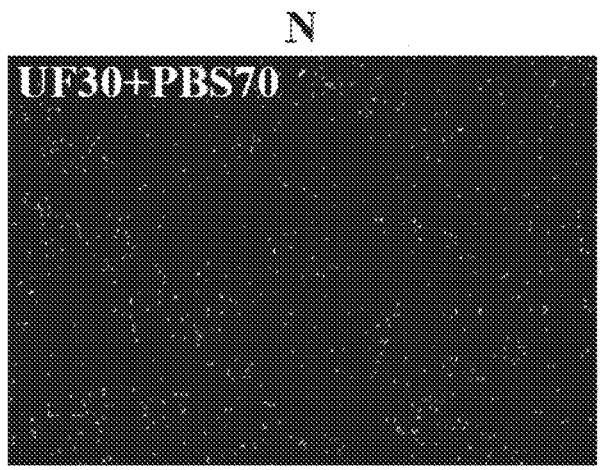
Figure 5L:
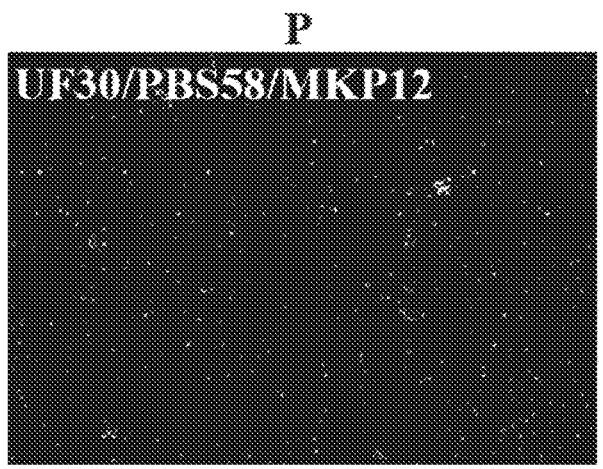
Figure 5M:
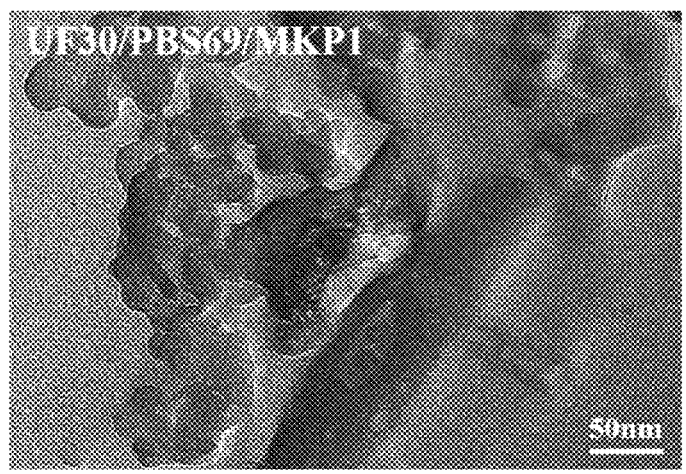
Figure 5N:
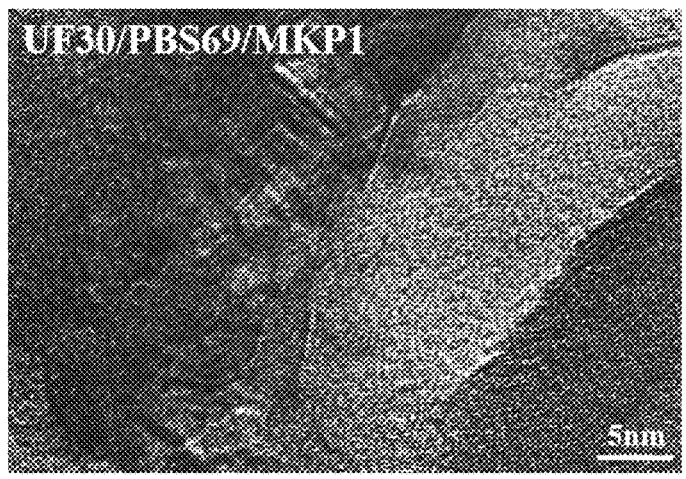
Figure 5O:
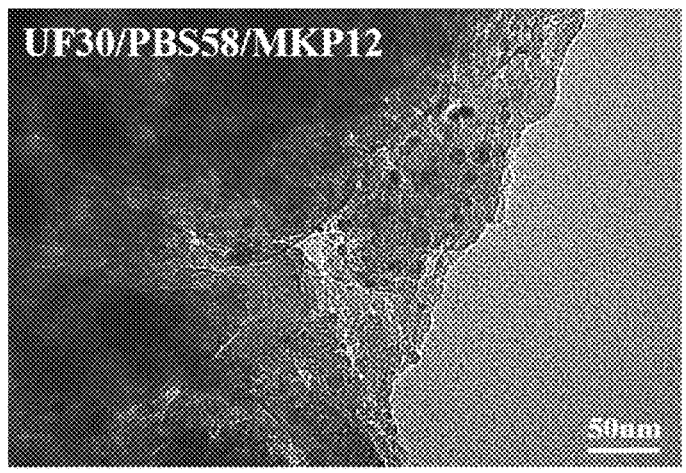
Figure 5P:
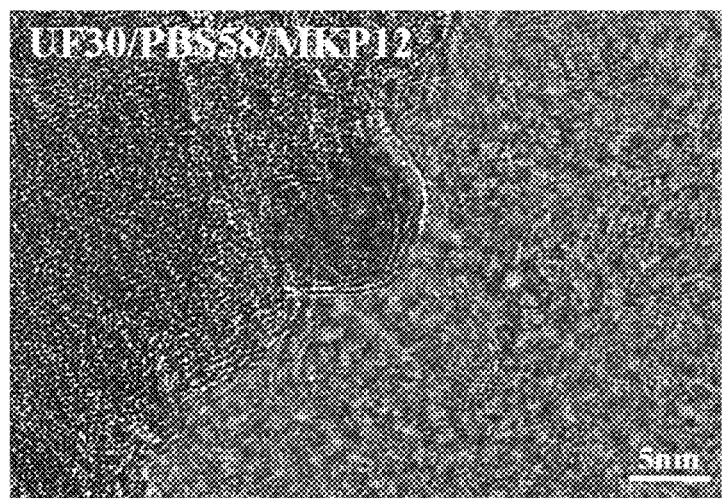

It can be seen from FIG. 5I that the brittle fracture surface of pure PBS is in the form of stripes. The morphology of some parts of the brittle fracture surface of UF30+PBS70 in FIG. 5G is similar to that of neat PBS in FIG. 5I, but a large number of phase-separated massive UF aggregates appear, indicating that the dispersion of the two components in the system is poorly uniform, and the corresponding EDX photos in FIG. 5J also clearly show that the distribution of element N in this system is extremely non-uniform. For binary composite UF/PBS, the brittle fracture surfaces of materials with various mass ratios of components in FIGS. 5A, 5B and 5C are relatively uniformly distributed with a large number of needle-shaped crystals, and as the contents of PBS increase, the quantities of these needle-shaped crystals decrease, and corresponding EDX images in FIGS. 5D, 5E and 5F show that they are UF crystals formed during reactive extrusion processes. In addition, there are no obvious two-phase separations in UF/PBS material systems with various mass ratios of components, and the corresponding EDX images also show that element N is relatively uniformly distributed in these materials. All of these further prove that the dispersions and mixings of UF and PBS in these binary composites are good. A few small spherical aggregates appear on the brittle fracture surface of UF30/PBS58/MKP12 in FIG. 5H, and the corresponding EDX images in FIG. 5K shows that they are MKP, and they are relatively uniformly distributed on the surface of the material overall. The TEM images of UF/PBS/MKP system in FIGS. 5M, 5N, 5O and 5P show that MKP is indeed present in the prepared composites at nano-scale. The average particle size of MKP in UF30/PBS69/MKP1 is 7 nm, and the average particle size of MKP in UF30/PBS58/MKP12 is 10 nm, indicating that the biodegradable polymer slow release composite UF/PBS/MKP of the present invention is indeed a nanocomposite. In addition, the brittle fracture surface of UF30/PBS58/MKP12 in FIG. 5H is smooth, and has no obvious phase separation and has good components compatibility. The corresponding EDX photos of N in FIG. 5K show that the UF produced by reactive extrusion of the present invention is uniformly dispersed in the composite. A few small spherical aggregates appear on their brittle fracture surface, and their corresponding EDX images of P in FIG. 5L show that they are MKP, and the distribution of MKP is relatively uniform overall.

Figure 6:
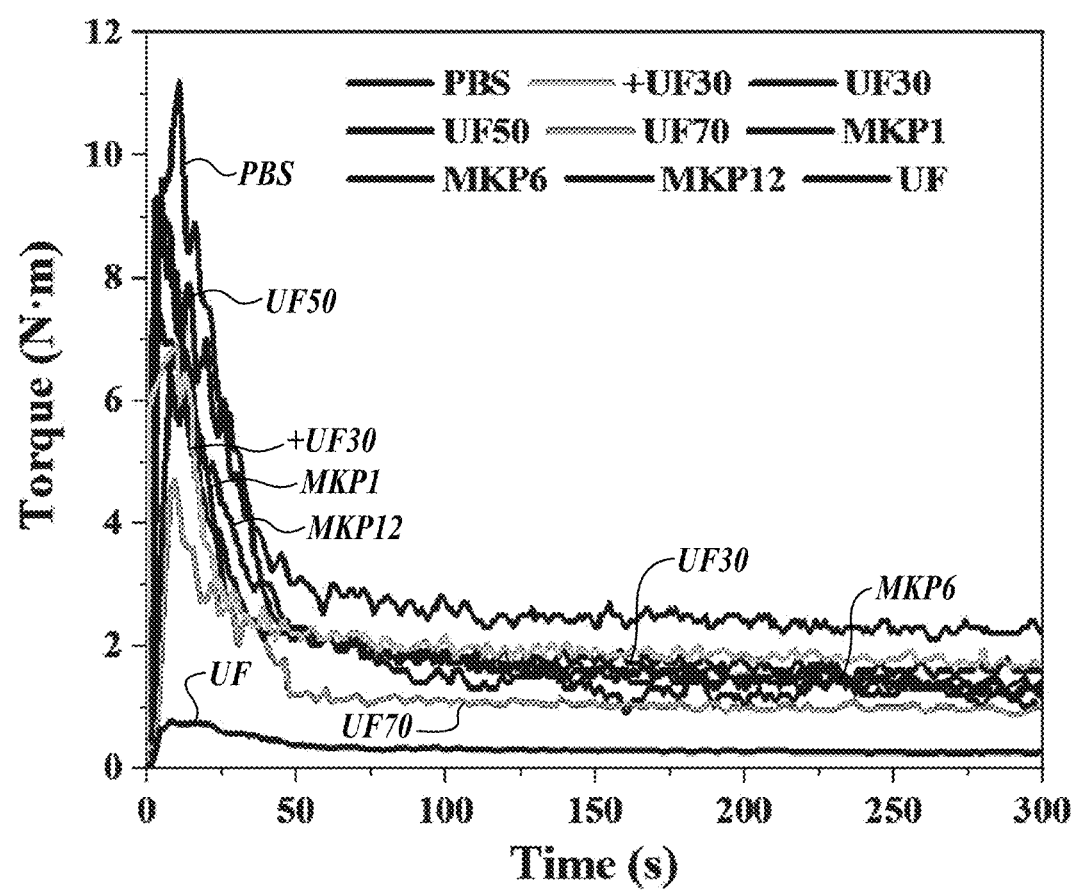
FIG. 6 is the torque rheological curves of materials PBS, UF, UF/PBS and PBS/UF/MKP.

It can be seen from FIG. 6 that, generally, all materials are melted and plasticized into a whole after exhausting the air brought in by their raw materials after 50 s in rheometer, so that their torque values reach stability. The torque of pure PBS after stabilization is 2.3 Nm, and that of the directly synthesized UF is 0.3 Nm. In addition, the torque of binary composite UF/PBS increases with increasing of PBS content, indicating that with the increase of PBS content, the viscosity of the composite system increases, and its processability is closer to that of pure PBS. Compared with UF30/PBS70, in UF30/PBS/MKP, small molecular inorganic MKP is used to replace some polymer PBS, so the torque value of the composite decreases with the increase of the amount of MKP added, but the change is not obvious.

Figure 7:
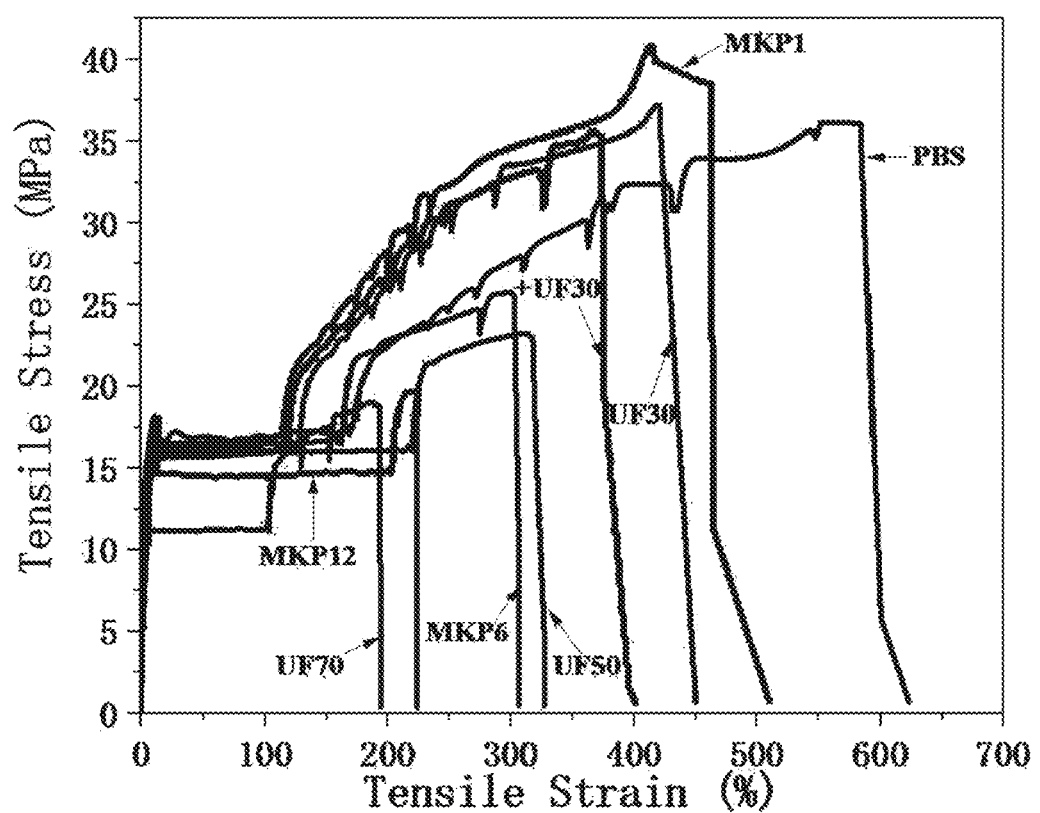
FIG. 7 is the stress-strain curves of PBS, UF/PBS, UF30+PBS70 and PBS/UF/MKP.

It can be seen from FIG. 7 and Table 3 that, among all binary composites, UF30/PBS70 has the most remarkable tensile strength, which is even higher than that of pure PBS, and other composites with various proportions also have relatively high tensile strength. In addition, binary composite UF/PBS has a higher Young's modulus than that of pure PBS, indicating that the stiffness of these composites has been improved. All tensile properties of UF70/PBS30 are better than those of UF70+PBS30, which is due to the difference of microstructure between them. Compared with pure PBS, composite UF/PBS/MKP can have a further improved tensile strength by properly adjusting the amount of MKP added, which is because the high specific surface area of the nanoparticles can play the role of micro-cross-linking points between molecular segments. Among all composites, UF30/PBS69/MKP1 has the highest tensile strength, which is nearly 10% higher than that of pure PBS, so that the nanocomposite can replace PBS to produce some agricultural implements. In addition, UF30/PBS/MKP composites all have higher Young's modulus than that of pure PBS, indicating that these composites have improved stiffness. It can also be seen from Table 2 that the ternary composite UF70/PBS58/MKP12 has the highest Young's modulus, which is about 137% higher than that of pure PBS.

Figure 8A:
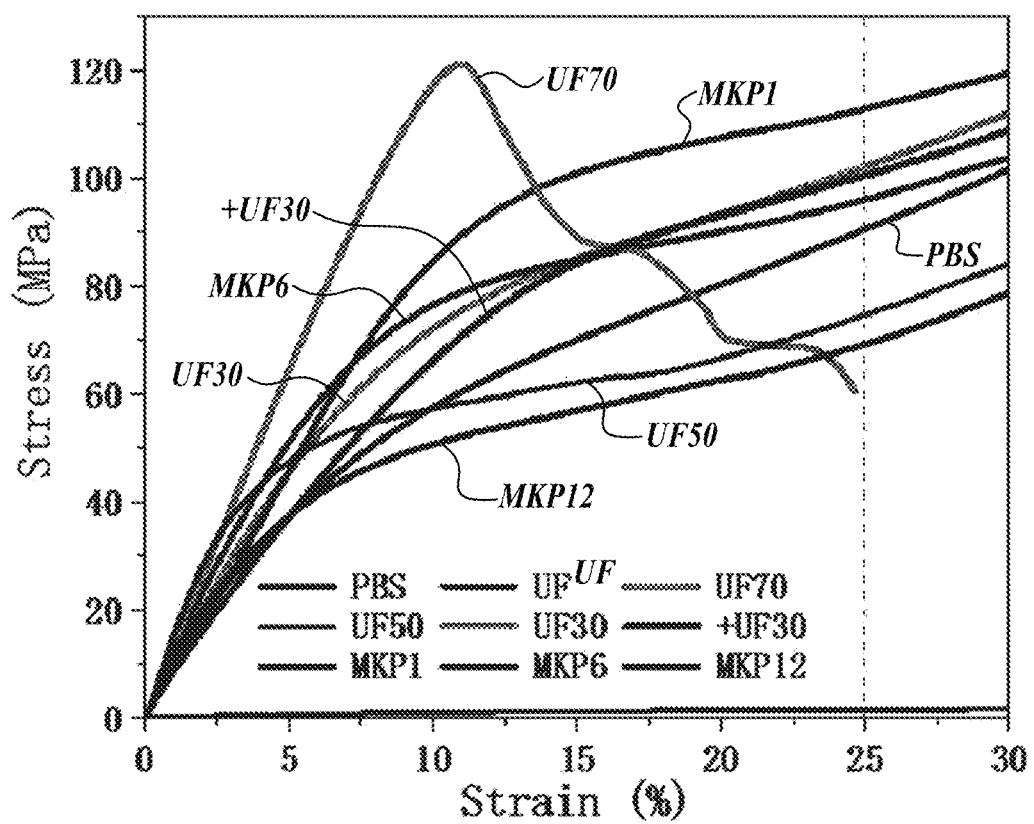
FIGS. 8A and 8B are the compression performance and average compression strength diagrams of PBS, UF, UF70/PBS30 (expressed as UF70), UF50/PBS50 (expressed as UF50), UF30/PBS70 (expressed as UF30), UF30+PBS70 (expressed as +UF30), UF30/PBS69/MKP1 (expressed as MKP1), UF30/PBS64/MKP6 (expressed as MKP6) and UF30/PBS58/MKP12 (expressed as MKP12) respectively.
Figure 8B:
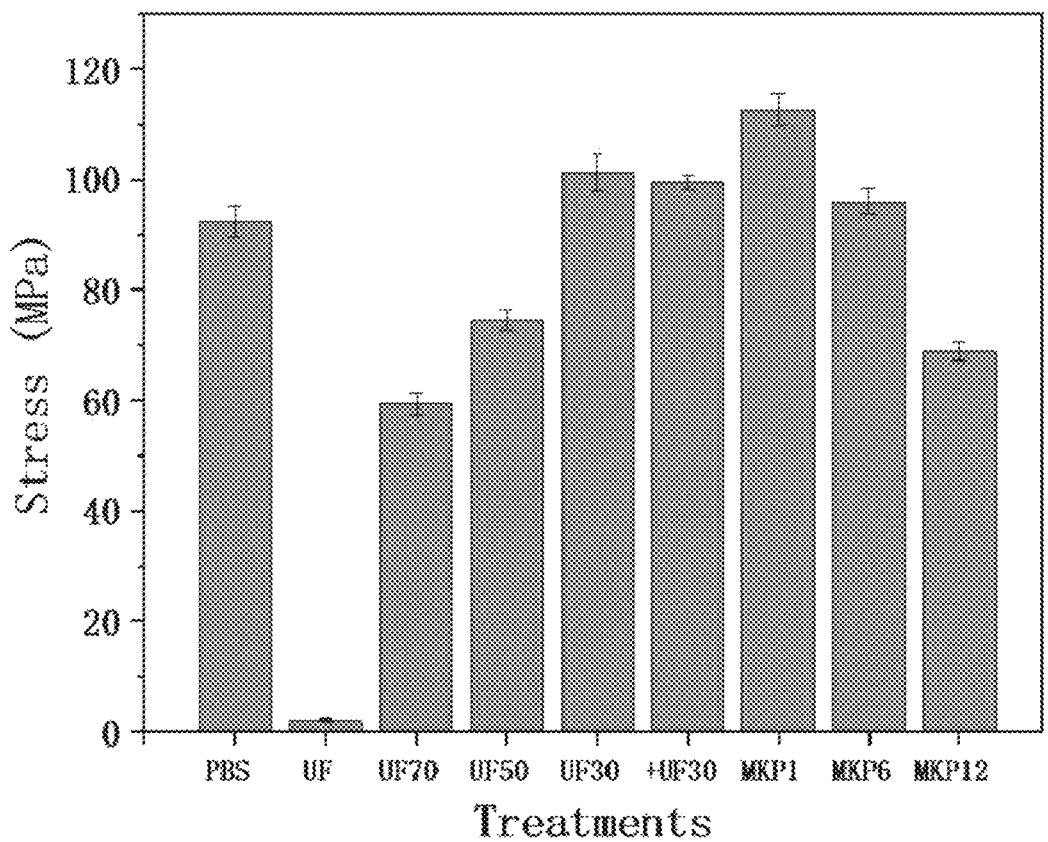

Compressive strength is an important indicator for the mechanical stability of granular materials used as fertilizers. It can be seen from the compression curves of FIG. 8A and the average compressive strength of FIG. 8B and Table 4 that, compared with that of the directly synthesized UF, binary composite UF/PBS has a significantly improved average compressive strength. Therefore, when actually used as a granular fertilizer, the prepared binary composite is more convenient to operate than directly synthesized pure UF, and can reduce the breakage loss during transportation. UF30/PBS70 has an average compressive strength of 101 MPa, which is higher than 92 MPa of pure PBS. In addition, UF70/PBS30 has a better compression performance than that of UF70+PBS30, and the reason is that they have different microstructures. The ternary composite UF30/PBS/MKP has a much better compressive strength than that of UF. Therefore, when actually used as a granular fertilizer, the prepared nanocomposite UF30/PBS/MKP is more convenient to operate than directly synthesized pure UF, and can reduce the breakage loss during transportation.

Figure 9A:
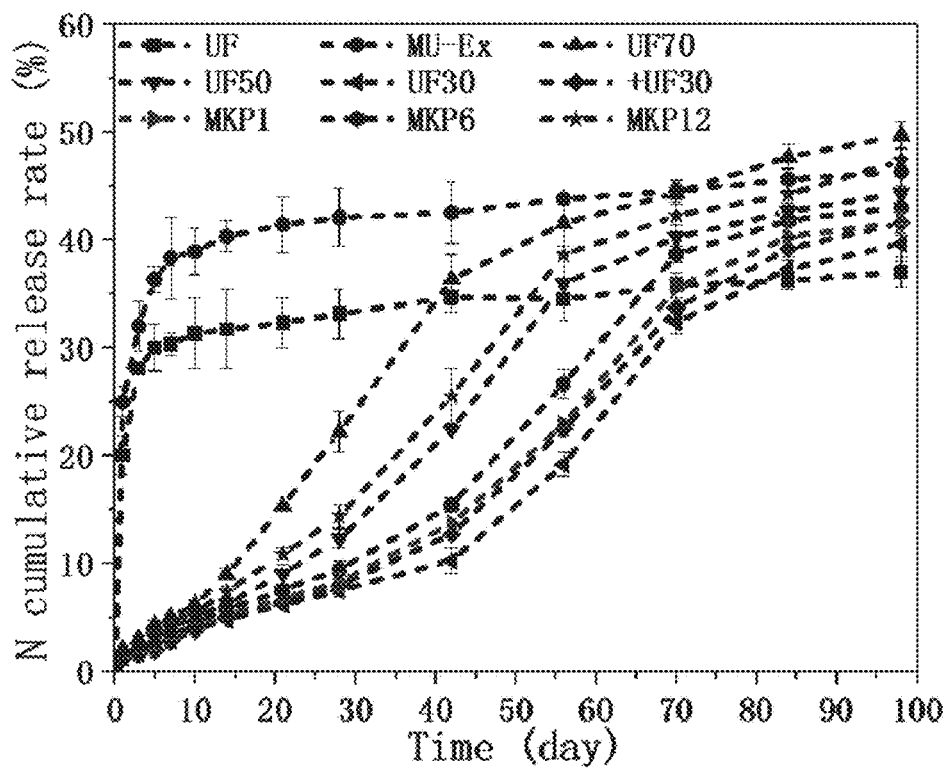
FIGS. 9A and 9B are the N (9A) and P (9B) release curves of MU-Ex, UF, UF/PBS, UF30+PBS70 and UF/PBS/MKP in still water.
Figure 9B:
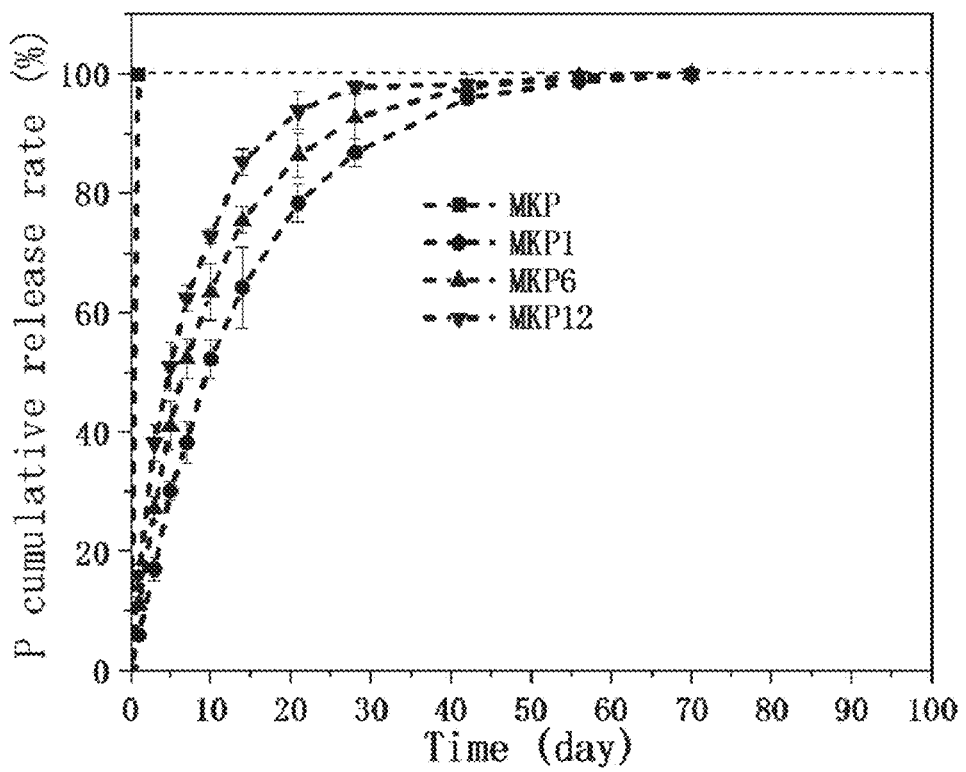

As shown in FIG. 9A, in the first 42 days of incubation in water, the cumulative release rate of nutrient N of MU-Ex (i.e., UF obtained by reactive extrusion of the present invention) is the highest, and about 42.48% of its nitrogen is released by the 42nd day. Especially, in the first 10 days from the beginning, its N is released at a very high rate, and by the 10th day, 38.89% of its content of N is released. The cumulative release rate curve of N of the directly synthesized UF is very similar to that of MU-Ex (i.e., UF obtained by reactive extrusion of the present invention), and the difference is that its N release speed is relatively slow with about 31.35% and 34.65% of its N content released by the 10th day and 42nd day respectively. This is because compared with UF prepared by reactive extrusion, i.e., MU-Ex, directly synthesized UF has a higher degree of polymerization and a larger molecular weight, so it is relatively more difficult to be hydrolyzed and releases nutrients contained in water. Compared with the reactive extruded UF (i.e., MU-Ex), binary composite UF/PBS has a lower release speed of N, especially in the early period of incubation (0-10 days). The N cumulative release rates of UF70/PBS30, UF50/PBS50 and UF30/PBS70 incubated in water for 0-10 days are only about 6.24%, 5.09% and 4.09% respectively, which help to reduce the N losses of composites during growth of plants. It is well known that the demand for element N in the early plants is not high and the absorption is little, so the slow release of N at this time will reduce its loss in the form of $NH_3$ and its leaching loss. It is worth noting that 10-70 days is the rapid growth stage of general plants, but the amount of N released by either directly synthesized UF or UF obtained by reactive extrusion (i.e., MU-Ex) is very small, so UF/PBS of the present invention is more in line with the demands of plants for nutrients at different growth stages of plants. Although the degree of polymerization of UF produced by reactive extrusion in UF30/PBS70 is relatively low, the N slow release performance of UF30/PBS70 is still better than that of UF30+PBS70 because of the difference in the microstructures of these two materials. The release of N from ternary composite UF30/PBS/MKP is slow in the first 10 days and then accelerates. The plants in the early stage of growth have no high demand for element N and have low absorption, so the slow release of element N at this time will reduce the loss in the form of $NH_3$ and the leaching loss. The middle stage is a stage at which plants grow rapidly and require a lot of nutrients, so the release of nutrient N of the nanocomposites of the present invention are more suitable for the needs of growth of crops. As can be seen from the release curve of P in FIG. 9B, for UF30/PBS69/MKP1, UF30/PBS64/MKP6 and UF30/PBS58/MKP12, their cumulative release rates of P are 52.16%, 63.51% and 72.79% respectively after incubation for 0-10 days in still water, their cumulative release rates of P are 43.79%, 34.30% and 25.52% respectively after incubation for 10-42 days in still water, and their cumulative release rates of P, after incubation for 42-70 days in still water, are 4.05%, 2.19%, and 1.69% respectively, which are far lower than the release rate of pure MKP, indicating that the ternary composite of the present invention can endow MKP, which is easily soluble in water, excellent slow/controlled release property.

Figure 10A:
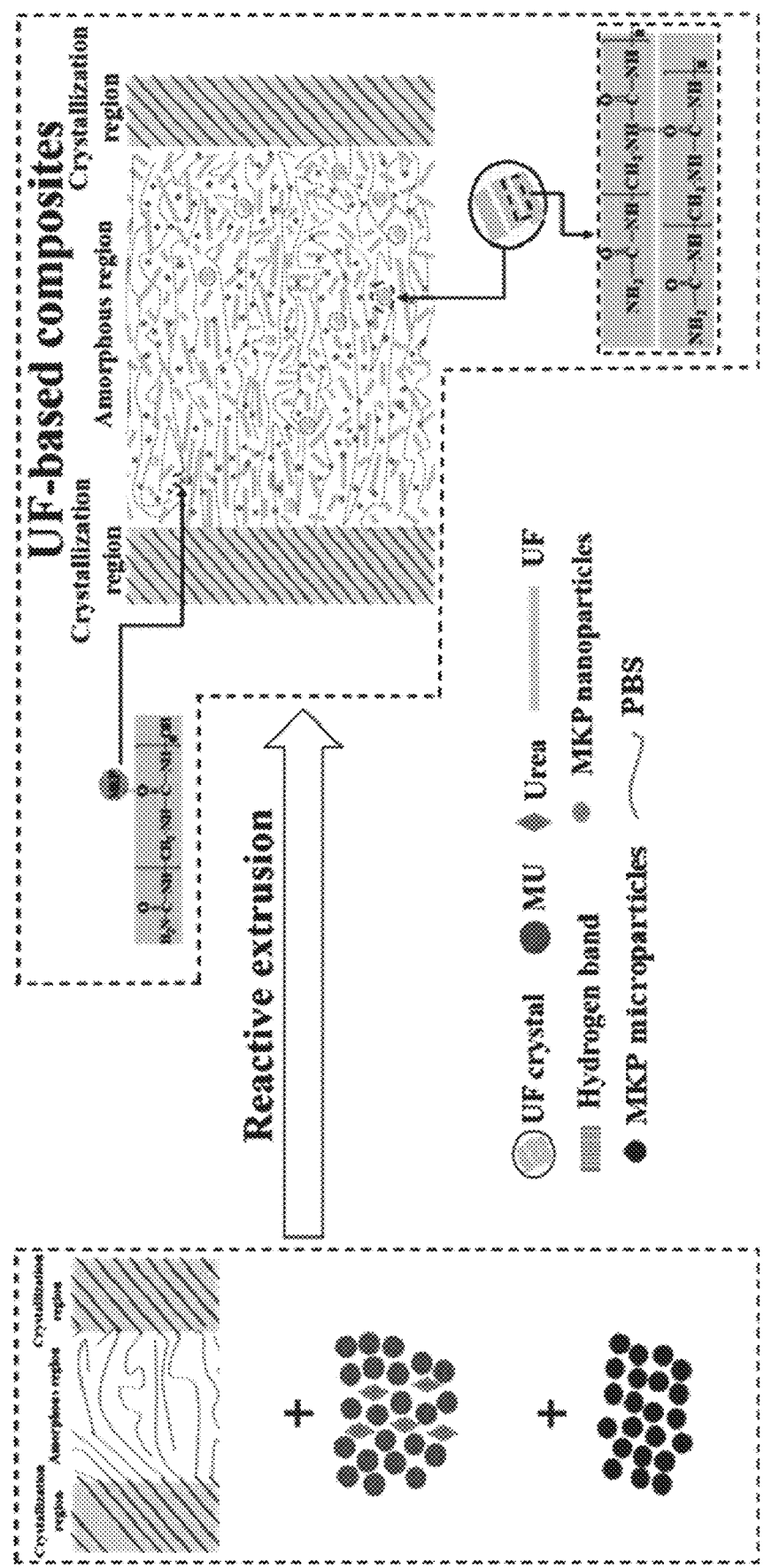
FIG. 10A is the schematic diagram of the reactive extrusion process of the present invention.
Figure 10B:
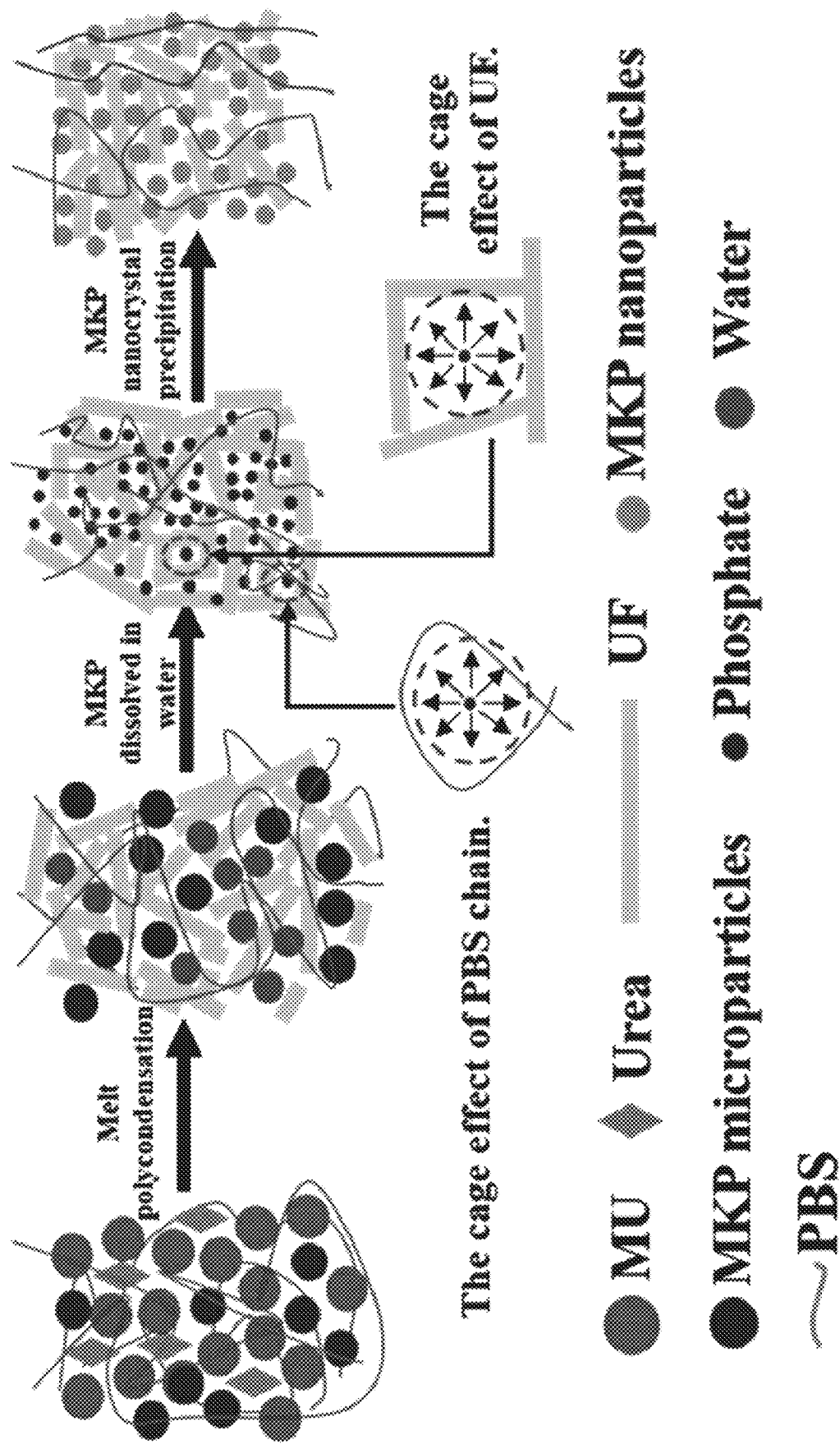
FIG. 10B is the forming mechanism schematic diagram of MKP nanoparticles during reactive extrusion process in ternary nanocomposite UF/PBS/MKP of the present invention.

It can be seen from the preparation mechanism diagram of FIGS. 10A and 10B that, MU undergoes melt polycondensation at a high temperature in extruder to form UF molecular chains with different degrees of polymerization, which are melted and dispersed in the macromolecules of PBS amorphous region to achieve a mixture of the two components at a molecular segment scale, rather than just in a simple physical blending manner. The mixing at the molecular segment scale enables PBS macromolecular chain segments hinder the formation of intermolecular and intramolecular hydrogen bonds in UF, which are easy to form. At the same time, UF molecular segments also could reduce the regularity of PBS molecular chain and the crystallinity of this component. Under the shearing and mixing action of the screw of the extruder, the soluble MKP is gradually dispersed and dissolved in the water generated by melt polycondensation of MU to produce UF in its surrounding environment. Subsequently, with the evaporation of water at a higher temperature in the extruder, the dissolved MKPs gradually precipitate out, and the growths of these MKP crystals are restricted due to the "cage effect" of their surrounding UF and PBS macromolecular chain segments and the hydrogen bond interactions between MKP and UF, resulting in them being perfectly confined to the nanoscale.

BEST MODE FOR CARRYING OUT THE INVENTION

In order to make the objectives, technical solutions and advantages of the present invention clearer, the technical solutions of the present invention will be described in detail below. Obviously, the described examples are only a part of the examples of the present invention, but not all of the examples. Based on the examples of the present invention, all the other embodiments obtained by those of ordinary skill in the art without creative efforts shall fall within the protection scope of the present invention.

The measurement standards of various experiments in the present invention:

Determination of rheological properties: a torque rheometer was used to determine the dynamic rheological properties of samples. A torque curve was recorded at 120° C. at a speed of 20 rpm, and the addition amount of each sample tested was 30 g.

Determination of tensile properties: according to GB/T 1040.2-2006, the tensile properties of samples were evaluated by a high and low temperature tensile testing machines (AI-7000-SGD) at a crosshead speed of 10 mm/min. The size of a dumbbell-shaped sample was 75×5×2 $mm^3$. Five measurement results of a sample were averaged.

Determination of the release performance of N and P of each material in still water: 0.5 g of a sample was placed in a transparent plastic bottle containing 100 g of distilled water. Then, the plastic bottle was placed in a dark place and incubated at room temperature (about 25° C.). At each incubation stage (1, 3, 5, 7, 10, 14, 21, 28, 42, 56, 70, 84, and 98 days), the remaining sample was taken from the bottle, carefully washed with distilled water, and then dried to a constant weight at 60° C. The content of N in the sample was determined by Kjeldahl method, and the P content was determined by $H_2SO_4$—$H_2O_2$ digestion and molybdenum antimony colorimetric methods. Each material had three repetitions at each sampling stage. The cumulative release rate of N or P of the test material was calculated using Equation (1).

$$R_{NT} = \frac{NT_0 - NTi}{NT_0} \times 100\% \qquad (1)$$

Among them, $R_{NT}$ was the cumulative release rate of N or P of the tested sample, $NT_0$ was the initial content of N or P of the tested substance, and $NT_i$ was the content of N or P of the tested sample in the incubation period i. Compression performance test: according to GB/T 1041-2008, compression tests of a sample was carried out on a universal testing machine (MTS CMT5105) equipped with a 20000 kgf load cell. A square cylinder (10×10×4 mm$^3$) was compressed between two rigid plates along the longitudinal direction at a constant rate of 5 mm/min until the maximum deformation was 60%. All treatments were repeated at least 5 times, and statistical analyses of significant differences between treatments were determined by Duncan multiple range testing.

Examples 1-6

A method for preparing biodegradable polymer slow/controlled release composites UF/PBS and UF/PBS/MKP by reactive extrusion comprises the steps of:

(1) Preparation of methylol-urea: adding formaldehyde aqueous solution and urea to a reactor, the molar ratio of the two being 1:1.2, then adjusting the solution to pH=9, reacting at 50° C. for a certain period, and then sealing and freezing the reaction solution, finally suction filtering it to obtain a filter cake, drying the filter cake in a vacuum oven, and then crushing it to 70 mesh to obtain a methylol-urea powder.

(2) subjecting raw materials PBS, MU and MKP to drying pretreatment separately, and then mixing the pre-treated two components PBS and MU or three components PBS, MU and MKP uniformly in a high-speed mixer respectively in the mass fractions shown in Table 1, to obtain a binary mixture of UF and PBS or a ternary mixture of UF, PBS and MKP with different mass ratios respectively.

(3) adding the binary mixture of UF and PBS or the ternary mixture of UF, PBS and MKP with different mass ratios into a co-rotating twin screw extruder (L/D=20, Nanjing Coperion Keya Machinery Co., Ltd., TE-20) respectively and extruding, to obtain the biodegradable slow/controlled release polymer composite UF/PBS or UF/PBS/MKP of the present invention respectively. The process parameters in the extrusion process were: the temperatures from the feeding zone to the die head of the twin-screw extruder were 100-110-120-120-115° C. successively, the rotating speed of screw was 30 rpm, and the feeding speed was 20 rpm.

TABLE 1

Amounts of raw materials

| Code | PBS (wt %) | MU (wt %) | MKP (wt %) |
| --- | --- | --- | --- |
| Example 1 | 70 | 30 | 0 |
| Example 2 | 50 | 50 | 0 |
| Example 3 | 30 | 70 | 0 |
| Example 4 | 69 | 30 | 1 |
| Example 5 | 64 | 30 | 6 |
| Example 6 | 58 | 30 | 12 |

The weight ratio of MU to PBS was set to be 30:70, 50:50 or 70:30 respectively, and the UF/PBS composites obtained by reactive extrusion were expressed as UF30/PBS70, UF50/PBS50 and UF70/PBS30 respectively. The weight ratio of MU, PBS and MKP was set to be 30:69:1, 30:64:6 or 30:58:12, and the UF/PBS/MKP nanocomposites obtained by reactive extrusion were expressed as UF30/PBS69/MKP1, UF30/PBS64/MKP6 and UF30/PBS58/MKP12, respectively.

Example 1

The biodegradable polymer slow/controlled release composite UF30/PBS70 prepared by reactive extrusion of the present invention was obtained, which had a tensile strength of 38.7 MPa, an average compressive strength of about 101 MPa, and a content of nutrient nitrogen of 83.97 mg/g.

Example 2

The biodegradable polymer slow/controlled release composite UF50/PBS50 prepared by reactive extrusion of the present invention was obtained, which had a tensile strength of 23.8 MPa, an average compressive strength of about 75 MPa, and a content of nutrient nitrogen of 139.95 mg/g.

Example 3

The biodegradable polymer slow/controlled release composite UF70/PBS30 prepared by reactive extrusion of the present invention was obtained, which had a tensile strength of 20.0 MPa, an average compressive strength of about 59 MPa, and a content of nutrient nitrogen of 195.93 mg/g.

Example 4

The biodegradable polymer slow/controlled release composite UF30/PBS69/MKP1 prepared by reactive extrusion of the present invention was obtained, which had a tensile strength of 40.8 MPa, an average compressive strength of about 112.7 MPa, and a content of nutrient nitrogen of 83.97 mg/g, a content of phosphorus, calculated as $P_2O_5$, of 5.22 mg/g, and a content of potassium, calculated as $K_2O$, of 3.46 mg/g.

Example 5

The biodegradable polymer slow/controlled release composite UF30/PBS64/MKP6 prepared by reactive extrusion of the present invention was obtained, which had a tensile strength of 23.6 MPa, an average compressive strength of about 96.0 MPa, and a content of nutrient nitrogen of 83.97 mg/g, a content of phosphorus, calculated as $P_2O_5$, of 31.32 mg/g, and a content of potassium, calculated as $K_2O$, of 20.76 mg/g.

Example 6

The biodegradable polymer slow/controlled release composite UF30/PBS58/MKP12 prepared by reactive extrusion of the present invention was obtained, which had a tensile strength of 19.5 MPa, an average compressive strength of about 68.9 MPa, and a content of nutrient nitrogen of 83.97 mg/g, a content of phosphorus, calculated as $P_2O_5$, of 62.64 mg/g, and a content of potassium, calculated as $K_2O$, of 41.52 mg/g.

Example 7: Technological Process of Directly Synthesized UF as a Control

Formaldehyde aqueous solution and urea with a molar ratio of 1:1.2 were added into a reaction vessel, then the solution was adjusted to pH=9, and reacted at 50° C. for a certain period, all these processes are exactly the same as those of (1) Preparation of methylol-urea in Examples 1-6 above. And then 2 wt % hydrochloric acid was added dropwise until a white precipitate was formed slightly, the adding of acid was stopped, after reacting for a certain period, the white and sticky product was dried and then crushed to 70 mesh to obtain the directly synthesized UF powder as a control.

Example 8: Technological Process of UF30+PBS70 as a Control

The preparation process of UF30+PBS70 was exactly the same as that of UF30/PBS70 in Examples 1 above, except that UF was used as one of the raw materials instead of MU. The specific process was as follows: PBS and UF prepared in Example 7 were subjected to a drying pretreatment respectively, then 70 wt % of pre-treated PBS and 30 wt % of pre-treated UF were mixed uniformly in a high-speed mixer, and then the mixture was extruded in an extruder, to obtain a simple physical blend UF30+PBS70 as a control. Extrusion equipment and the specific process parameters in the extrusion process were exactly the same as those in Examples 1-6.

Example 9: Technological Process of Reactive Extrusion of MU (i.e., MU-Ex) as a Control The preparation process of MU-Ex was exactly the same as that of UF/PBS in Examples 1-6 above, except that only MU and no PBS were used as the raw materials. The specific process was as follows: Pre-treated MU powder by drying was added into an extruder, extruded and blended, to obtain an extruded MU (i.e., MU-Ex) as a control. Extrusion equipment and the specific process parameters in the extrusion process were exactly the same as those in Examples 1-6.

Example 10: Technological Process of Pure PBS as a Control

The preparation process of pure PBS was exactly the same as that of UF/PBS in Examples 1-6 above, except that only PBS and no MU were used as the raw materials.

Example 11: Technological Process for Synthesizing MU as a Control

It was exactly the same as the preparation process of methylol-urea in Examples 1-6 above.

TABLE 2

Thermal stability parameters of materials

| Item | $T_{5\%}$ (° C.) | $T_{max}$ (° C.) | Residual rate (%) |
|---|---|---|---|
| Reactive extruded MU (Example 9) | 195.28 | 316.45 | 13.38 |
| Directly synthesized UF (Example 7) | 221.33 | 322.32 | 5.98 |
| Pure PBS (Example 10) | 367.44 | 431.26 | 1.19 |
| UF30/PBS70 (Example 1) | 271.45 | 429.34 | 3.12 |
| UF30 + PBS70 (Example 8) | 272.61 | 431.38 | 4.15 |

TABLE 3

Tensile property data of materials

| Sample | Tensile Strength (MPa) | Elongation at break (%) | Young's modulus (MPa) |
|---|---|---|---|
| Pure PBS (Example 10) | 37.2 ± 1.2 | 526.4 ± 23.1 | 133.6 ± 9.3 |
| UF70/PBS30 (Example 3) | 20.0 ± 0.8 | 311.1 ± 10.2 | 323.9 ± 13.6 |
| UF50/PBS50 (Example 2) | 23.8 ± 1.4 | 339.8 ± 46.1 | 307.1 ± 14.0 |
| UF30/PBS7 (Example 1) | 38.7 ± 1.4 | 457.8 ± 15.9 | 268.4 ± 28.7 |
| UF30 + PBS70 (Example 8) | 36.1 ± 1.5 | 403.3 ± 19.8 | 230.3 ± 23.5 |
| UF30/PBS69/MKP1 (Example 4) | 40.8 ± 1.1 | 437.8 ± 14.5 | 224.6 ± 14.8 |
| UF30/PBS64/MKP6 (Example 5) | 23.6 ± 0.8 | 319.3 ± 17.3 | 203.1 ± 14.8 |
| UF30/PBS58/MKP12 (Example 6) | 19.5 ± 0.4 | 215.0 ± 9.6 | 316.7 ± 10.0 |

TABLE 4

Average compressive strength values of materials

| Sample | Average compressive strength (MPa) |
|---|---|
| Pure PBS (Example 10) | 92.4 ± 2.9 |
| Directly synthesized UF (Example 7) | 2.0 ± 0.3 |
| UF70/PBS30 (Example 3) | 59.4 ± 2.0 |
| UF50/PBS50 (Example 2) | 74.6 ± 1.8 |
| UF30/PBS70 (Example 1) | 101.3 ± 3.5 |
| UF30 + PBS70 (Example 8) | 99.5 ± 1.4 |
| UF30/PBS69/MKP1 (Example 4) | 112.7 ± 2.9 |
| UF30/PBS64/MKP6 (Example 5) | 96.0 ± 2.3 |
| UF30/PBS58/MKP12 (Example 6) | 69.9 ± 1.8 |

The above examples are only specific embodiments of the present invention, but the protection scope of the present invention is not limited to this. Any person skilled in the art can easily think of changes or replacements within the technical scope disclosed by the present invention. They should fall within the protection scope of the present invention. Therefore, the protection scope of the present invention should be determined by the protection scope of the claims.

The invention claimed is:

1. A method for preparing a biodegradable polymer binary composite urea-formaldehyde/poly(butylene succinate) or a biodegradable polymer slow release ternary nanocomposite urea-formaldehyde/poly(butylene succinate)/potassium dihydrogen phosphate by reactive extrusion, the method comprising:
   mixing two components poly(butylene succinate) and methylol-urea or three components poly(butylene succinate), methylol-urea and potassium dihydrogen phosphate uniformly, and then extruding the uniformly mixed binary or ternary mixture by a screw extruder;
   wherein the methylol-urea is melt polycondensed in the screw extruder to form urea-formaldehyde molecular chains with different polymerization degrees, and the generated urea-formaldehyde molecular chains are dispersed in a non-crystalline area of the poly(butylene succinate), and the resulting urea-formaldehyde molecular chains are mixed with the poly(butylene succinate) molecular chains in a molecular segment scale, rather than just in a simple physical blend manner; furthermore, for the ternary composite containing potassium dihydrogen phosphate, under shearing and mixing actions of screw of the screw extruder, the potassium dihydrogen phosphate gradually disperses and dissolves in the water generated by the melt polycondensation of methylol-urea to produce urea-formaldehyde in its surrounding environment, and then as the water evaporates at the subsequent higher temperature in the screw extruder, the dissolved potassium dihydrogen phosphate gradually precipitates out, and the growths of potassium dihydrogen phosphate crystals are restricted by the hindering of their surrounding macromolecular chain segments of urea-formaldehyde and poly(butylene succinate) and the hydrogen bond interaction between potassium dihydrogen phosphate and urea-formaldehyde, thereby resulting potassium dihydrogen phosphate crystals being confined to a nanoscale; and the biodegradable polymer slow release composite urea-formaldehyde/poly(butylene succinate) containing nutrient N or the biodegradable polymer slow release nanocomposite urea-formaldehyde/poly(butylenesuccinate)/potassium dihydrogen phosphate containing nutrients N, P and K is obtained; and the methylol-urea is prepared by steps of adding urea and formaldehyde aqueous solution to a reactor, adjusting the resulting solution to pH=9, reacting them at 50° C., freezing and vacuum filtering the reaction solution to obtain a filter cake, drying the filter cake, and then crushing it to obtain the methylol-urea.

2. The method for preparing a biodegradable polymer slow release binary composite urea-formaldehyde/poly(butylene succinate) and a biodegradable polymer slow release ternary nanocomposite urea-formaldehyde/poly(butylene succinate)/potassium dihydrogen phosphate according to claim 1, characterized in that the extrusion temperatures of the screw extruder are between 100° C. and 120° C., and the temperature in feeding zone is the lowest, moreover, except that of the die head, the temperatures of other zones increase gradually from the feeding zone.

3. The method for preparing a biodegradable polymer slow release binary composite urea-formaldehyde/poly(butylene succinate) and a biodegradable polymer slow release ternary nanocomposite urea-formaldehyde/poly(butylene succinate)/potassium dihydrogen phosphate according to claim 1, characterized in that a molar ratio of formaldehyde to urea is 1:1.1~1.4.

4. The method for preparing a biodegradable polymer slow release binary composite urea-formaldehyde/poly(butylene succinate) and a biodegradable polymer slow release ternary nanocomposite urea-formaldehyde/poly(butylene succinate)/potassium dihydrogen phosphate according to claim 3, characterized in that the optimum molar ratio of formaldehyde to urea is 1:1.2.

5. The biodegradable polymer slow release ternary nanocomposite urea-formaldehyde/poly(butylene succinate)/potassium dihydrogen phosphate prepared by reactive extrusion according to claim 1, characterized in that, during the process of reactive extrusion, by means of the interactions among the components and the by-product water of the melt polycondensation of methylol-urea to produce urea-formaldehyde, the ordinary potassium dihydrogen phosphate particles as one of the raw materials are turned into nano-scale potassium dihydrogen phosphate, which not only is capable of endowing the instant potassium dihydrogen phosphate with a certain slow release performance, but also can serve as a modifier to improve the physical and mechanical properties of the prepared nanocomposite, and the urea-formaldehyde molecular chains are dispersed in a non-crystalline area of poly(butylene succinate), and the urea-formaldehyde molecular chains are mixed with the poly(butylene succinate) molecular chains in a molecular segment scale, rather than just in a simple physical blend manner.

6. The biodegradable polymer slow release binary composite urea-formaldehyde/poly(butylene succinate) and the biodegradable polymer slow release ternary nanocomposite urea-formaldehyde/poly(butylene succinate)/potassium dihydrogen phosphate according to claim 1, characterized in that, the prepared composites all have higher compressive strengths than that of pure urea-formaldehyde, and the urea-formaldehyde molecular chains are dispersed in a non-crystalline area of poly(butylene succinate), and the urea-formaldehyde molecular chains are mixed with the poly(butylene succinate) molecular chains in a molecular segment scale, rather than just in a simple physical blend manner.

7. The biodegradable polymer slow release binary composite urea-formaldehyde/poly(butylene succinate) and the biodegradable polymer slow release ternary nanocomposite urea-formaldehyde/poly(butylene succinate)/potassium dihydrogen phosphate according to claim 1, characterized in that, the prepared composites can be directly used as a biodegradable polymer slow release fertilizer, or as a matrix polymer of slow release fertilizers, and the binary composite or ternary nanocomposite with high poly(butylene succinate) contents can also replace poly(butylene succinate) for preparing other agricultural implements, and the urea-formaldehyde molecular chains are dispersed in a non-crystalline area of poly(butylene succinate), and the urea-formaldehyde molecular chains are mixed with the poly(butylene succinate) molecular chains in a molecular segment scale, rather than just in a simple physical blend manner.

8. The biodegradable polymer slow release binary composite ureaformaldehyde/poly(butylene succinate) and the biodegradable polymer slow release ternary nanocomposite urea-formaldehyde/poly(butylene succinate)/potassium dihydrogen phosphate according to claim 7, characterized in that, the other agricultural implements are selected from agricultural films, nursery pots and vegetation nets.

* * * * *